United States Patent
Li et al.

(10) Patent No.: US 12,162,753 B2
(45) Date of Patent: Dec. 10, 2024

(54) PREPARATION METHOD FOR NANO FERRIC PHOSPHATE WITH LOW SULFUR CONTENT

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Lingjie Li, Guangdong (CN); Changdong Li, Guangdong (CN); Shenghe Tang, Guangdong (CN); Dingshan Ruan, Guangdong (CN); Shuai Han, Guangdong (CN); Gaorong Huang, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(*) Notice: Subject to any disclaimer, the term of this patent is extended or adjusted under 35 U.S.C. 154(b) by 0 days.

(21) Appl. No.: 18/265,882

(22) PCT Filed: May 27, 2022

(86) PCT No.: PCT/CN2022/095689
§ 371 (c)(1),
(2) Date: Jun. 7, 2023

(87) PCT Pub. No.: WO2023/273742
PCT Pub. Date: Jan. 5, 2023

(65) Prior Publication Data
US 2024/0025745 A1   Jan. 25, 2024

(30) Foreign Application Priority Data
Jul. 1, 2021   (CN) .......................... 202110748109

(51) Int. Cl.
  C01B 25/37   (2006.01)
(52) U.S. Cl.
  CPC ........ *C01B 25/375* (2013.01); *C01P 2002/72* (2013.01); *C01P 2004/03* (2013.01); *C01P 2004/61* (2013.01)
(58) Field of Classification Search
  None
  See application file for complete search history.

(56) References Cited

U.S. PATENT DOCUMENTS

2012/0237425 A1   9/2012   Nishio et al.

FOREIGN PATENT DOCUMENTS

| CN | 101172594 A | * | 5/2008 |
| CN | 102583292 A | * | 7/2012 |

(Continued)

OTHER PUBLICATIONS

Machine Translation for CN110510593 (Year: 2023).*

(Continued)

*Primary Examiner* — Michael Forrest
(74) *Attorney, Agent, or Firm* — Myers Wolin, LLC

(57) ABSTRACT

A method for preparing nano iron phosphate with low sulfur content. The method may include: S1: mixing a phosphorus source and an iron source to obtain a raw material solution, then adding alkali and a surfactant, adjusting a pH, and stirring and reacting to obtain an iron phosphate dihydrate slurry, S2: adding phosphoric acid solution into the iron phosphate dihydrate slurry, adjusting the pH, heating and stirring for aging, and filtering to obtain iron phosphate dihydrate, S3: adding water into the iron phosphate dihy- (Continued)

drate for slurrying, and grinding to obtain a ground slurry; and S4: adding the ground slurry into a washing solution to wash, carrying out solid-liquid separation, and calcining a solid phase to obtain the nano iron phosphate with low sulfur content.

7 Claims, 2 Drawing Sheets

(56) References Cited

FOREIGN PATENT DOCUMENTS

| CN | 104628020 | A |   | 5/2015 |
|---|---|---|---|---|
| CN | 105118995 | A | * | 12/2015 |
| CN | 106882780 | A |   | 6/2017 |
| CN | 108117055 | A |   | 6/2018 |
| CN | 109850862 | A | * | 6/2019 |
| CN | 110510593 | A |   | 11/2019 |
| CN | 110857216 | A |   | 3/2020 |
| CN | 111153391 | A |   | 5/2020 |
| CN | 112645299 | A |   | 4/2021 |
| CN | 113353908 | A | * | 9/2021 |
| CN | 113479861 | A |   | 10/2021 |
| CN | 113479861 | B |   | 2/2023 |

OTHER PUBLICATIONS

Machine Translation for CN105118995 (Year: 2023).*
Machine Translation for CN104628020 (Year: 2023).*
Machine Translation for CN111153391 (Year: 2023).*
Machine Translation for CN109850862 (Year: 2023).*
Machine Translation for CN101172594 (Year: 2023).*
Machine translation of CN-113353908-A (Year: 2021).*
Machine translation of CN-102583292-A (Year: 2012).*
International Search Report and Written Opinion of the International Searching Authority issued by the China National Intellectual Property Administration for International Patent Application No. PCT/CN2022/095689, mailed on Aug. 19, 2022, with an English translation.
First Office Action and Search Report issued by the State Intellectual Property Office of People's Republic of China for Chinese Patent Application No. 202110748109.3, dated Jun. 28, 2022, with an English translation.
Luo et al., "Influence of sulfur on electrochemical performance of lithium iron phosphate", Modern Chemical Industry, Jul. 2015, pp. 82-85, vol. 35, No. 7, China, with an English abstract.
Notification to Grant Patent Right for Invention issued by the State Intellectual Property Office of People's Republic of China for Chinese Patent Application No. 202110748109.3, dated Dec. 14, 2022, with an English translation.

* cited by examiner

PREPARATION METHOD FOR NANO FERRIC PHOSPHATE WITH LOW SULFUR CONTENT

CROSS-REFERENCE TO RELATED APPLICATIONS

This application is a National Stage under 35 U.S.C. § 371 of International Application Number PCT/CN2022/095689, filed on May 27, 2022, and which designated the U.S., which claims priority to Chinese patent application No. 202110748109.3, filed on Jul. 1, 2021. The contents of each are incorporated herein by reference in their entirety.

TECHNICAL FIELD

The present disclosure relates to the field of lithium ion battery technologies, and more particularly, to a method for preparing nano iron phosphate with low sulfur content.

BACKGROUND

With the rapid development of new energy industry, a lithium ion battery, as a new and green energy supply method, is widely used in automobile power battery, electrochemical energy storage, 3C product battery and other fields. A lithium iron phosphate battery occupies a large share in the market because of an excellent cycle performance, a safety performance, a low price, and environmental protection and non-pollution characteristics, and a demand of the lithium iron phosphate battery is increasing rapidly with the popularization of new energy vehicles.

Currently, main methods for preparing a lithium iron phosphate cathode material comprise a high-temperature solid-phase method, a carbothermic reduction method, a sol-gel method, a coprecipitation method, a hydrothermal method, and the like, wherein the carbothermic reduction method is stable in technology, low in cost and easy to control, thus being a mainstream industrial preparation method. As a key raw material, iron phosphate has a great influence on an electrical performance of a finished product of lithium iron phosphate in structure, property and quality. At present, the iron phosphate is mainly prepared with ferrous sulfate as a raw material by a controlled crystallization method, and a product of the iron phosphate contains a large number of impurities, which are difficult to be removed during subsequent calcination to synthesize the lithium iron phosphate, thus having a great influence on an electrical performance of the lithium iron phosphate battery, and thus greatly affecting the application of the iron phosphate in a battery material. An influence of a sulfur element impurity is most severe. Yanhua Luo and others found that when a mass fraction of sulfur reached a certain level, an influence on a particle morphology, a discharge capacity and a cycle performance of the lithium iron phosphate was gradually apparent, when the mass fraction of sulfur was less than 0.22%, the particle morphology of the lithium iron phosphate was spherical, a first discharge capacity at 1 C reached 152 mAh/g, and after 150 cycles, the capacity could still be maintained at 140 mAh/g, with a good electrochemical performance; and when the mass fraction of sulfur was higher than 0.34%, lithium iron phosphate particles were agglomerated, the first discharge capacity at 1 C was lower than 130 mAh/g, and after 150 cycles, the capacity was lower than 107 mAh/g.

Under an existing production technology, it is difficult to remove a sulfate radical from the iron phosphate, and a large volume of washing water is often needed to bring out the impurity. However, with the development of technology, a crystal structure of the iron phosphate is gradually nano-sized, and a surface and an interior of a synthesized iron phosphate particle both contain a large amount of $SO_4^{2-}$. At present, a conventional washing technology has a certain effect on $SO_4^{2-}$ adsorbed on the surface, but has a bad removal effect on $SO_4^{2-}$ wrapped inside the particle, which, on one hand, seriously affects the electrochemical performance of the prepared lithium iron phosphate cathode material, and on the other hand, uses a large volume of washing water, thus greatly increasing a production cost and an environmental burden.

Currently, a main method for controlling the sulfur content in the iron phosphate in industry comprises pH control during synthesis, multi-stage washing, citric acid washing, long-time calcination, and the like. These methods may often affect a tap density, a reactivity, a surface morphology and other performances of products, or a large volume of washing water and high-cost citric acid are used, which causes great pollution and great pressure on subsequent wastewater treatment. In a process of transforming iron phosphate dihydrate into the iron phosphate by calcination, residual sulfate radicals in particles are often removed in a form of $SO_2$ at a high temperature. An existing technology has a low calcination temperature and a long calcination time, which leads to a poor removal effect on an S element, and also leads to the melting of primary particles of the iron phosphate and the decrease of reactivity. Therefore, developing a method for reducing the sulfur content with an excellent effect, a low cost and little environmental influence is of great significance to optimize a synthesis technology of battery-grade nano iron phosphate and improve a product performance.

SUMMARY

The present disclosure aims to solve at least one of the above technical problems in the prior art. Therefore, the present disclosure provides a method for preparing nano iron phosphate with low sulfur content.

According to an aspect of the present disclosure, a method for preparing nano iron phosphate with low sulfur content is provided, which comprises the following steps of:
  S1: mixing a phosphorus source and an iron source to obtain a raw material solution, then adding alkali and a surfactant, adjusting a pH, and stirring and reacting to obtain an iron phosphate dihydrate slurry;
  S2: adding a phosphoric acid solution into the iron phosphate dihydrate slurry, adjusting the pH, heating and stirring for aging, and filtering to obtain iron phosphate dihydrate;
  S3: adding water into the iron phosphate dihydrate for slurrying, and grinding to obtain a ground slurry; and
  S4: adding the ground slurry into a washing solution to wash, carrying out solid-liquid separation, and calcining a solid phase to obtain the nano iron phosphate with low sulfur content.

In some embodiments of the present disclosure, in step S1, the iron source is ferrous sulfate, and an oxidant is further added in the raw material solution; and a molar ratio of the iron to the phosphorus in the raw material solution is 1:(0.9 to 1.1).

In some embodiments of the present disclosure, in step S1, the phosphorus source is a phosphoric acid.

In some preferred implementations of the present disclosure, the oxidant is $H_2O_2$. $Fe^{2+}$ is oxidized into $Fe^{3+}$ by the oxidant.

In some embodiments of the present disclosure, in step S1, the alkali is at least one of sodium hydroxide, potassium hydroxide, sodium carbonate, sodium bicarbonate, potassium carbonate, ammonia water or ammonium salt; and preferably, the alkali is the sodium hydroxide.

In some embodiments of the present disclosure, in step S1, the surfactant is at least one of sodium stearate, polyvinylpyrrolidone, sodium dodecyl sulfonate, dodecane phenol plyoxyethylene, hexadecyl trimethyl ammonium bromide or hexadecyl trimethyl ammonium chloride.

In some embodiments of the present disclosure, in step S1, the surfactant is compounded by polyvinylpyrrolidone and sodium dodecyl sulfonate in a mass ratio of about 1:1. In a synthesis process of battery-grade nano iron phosphate, a certain volume of surfactant generally needs to be added to control size nanocrystallization of the particle. In the present disclosure, the ratio of the surfactant is innovatively optimized, which can effectively reduce adhesion of the sulfate radical in the particle and reduce a sulfur impurity content of final products while ensuring a synthesis effect of the iron phosphate.

In some embodiments of the present disclosure, in step S1, the pH is 1.0 to 2.5.

In some embodiments of the present disclosure, in step S1, a mass ratio of the raw material solution to an alkali solution is 1:(0.1 to 0.3).

In some embodiments of the present disclosure, in step S1, the stirring speed is 100 rpm to 800 rpm, and the reaction is performed at a temperature of 20° C. to 60° C. for 0.5 hour to 5 hours.

In some embodiments of the present disclosure, in step S1, the surfactant and the water are prepared into a surfactant mixed solution with a mass concentration of 10% to 40%, and a mass ratio of the raw material solution to the surfactant mixed solution is 1:(0.004 to 0.04).

In some embodiments of the present disclosure, in step S2, a mass concentration of the phosphoric acid solution is 60% to 80%; and the pH is 1.0 to 2.0.

In some embodiments of the present disclosure, in step S2, the aging is performed at a stirring speed of 50 rpm to 300 rpm and at a temperature of 60° C. to 100° C., and the aging lasts for 1 hour to 5 hours.

In some embodiments of the present disclosure, in step S2, a particle size of the obtained iron phosphate dihydrate is 8 μm to 20 μm.

In some embodiments of the present disclosure, in step S3, a particle size of a dispersed phase of the ground slurry is 2.5 μm to 10 μm. A particle size of wet grinding needs to be adjusted according to requirements of a synthesis technology of lithium iron phosphate in a later stage.

In some embodiments of the present disclosure, in step S3, a mass ratio of the iron phosphate dihydrate to the water is 1:(1 to 4).

In some embodiments of the present disclosure, in step S4, the washing is performed twice.

In some embodiments of the present disclosure, in step S4, the washing solution is one of water or 0.5% to 2% sodium carbonate solution; and preferably, the water is hot water at 60° C. to 90° C. For selection of the washing solution, in the present disclosure, not only conventional deionized water is selected, but also hot pure water is innovatively selected, and the hot pure water can reduce a viscosity of the slurry and improve a washing effect. The sodium carbonate solution is also innovatively selected, the sodium carbonate has a good reaction effect with the sulfate radical, and is easy to be removed, and meanwhile, wastewater is easy to be treated, which can further reduce the sulfur element impurity content in the iron phosphate. The washing solution may be selected according to production cost control and product performance requirements.

In some embodiments of the present disclosure, in step S4, a mass ratio of the washing solution to the iron phosphate dihydrate is (5 to 20): 1.

In some embodiments of the present disclosure, in step S4, a water content of a filter residue is 15% to 30%.

In some embodiments of the present disclosure, in step S4, the calcining is performed at a temperature of 450° C. to 800° C. for 0.5 hour to 5 hours under a heating rate of 2° C./min to 10° C./min.

In some embodiments of the present disclosure, in step S4, the calcining is performed at a temperature of 600° C. to 800° C. for 0.5 hour to 3 hours. A rapid high-temperature short-period calcination method is used, and according to thermodynamic calculation and experiment results, the temperature of the calcining is increased to over 600° C. and the time of the calcining is controlled within 3 hours, which can effectively remove the residual sulfate radical in the iron phosphate particle, and can also ensure a chemical performance of products.

In some embodiments of the present disclosure, in step S4, compressed air is required for the calcining. Introduction of pure compressed air can accelerate removal of an S element.

According to a preferred embodiment of the present disclosure, the present disclosure at least has the following beneficial effects:

1. In the present disclosure, the grinding process in the synthesis technology of the lithium iron phosphate is innovatively pre-processed, the wet grinding is used to reduce the particle size of the iron phosphate dihydrate and release agglomeration of secondary particles of the iron phosphate dihydrate, so that the sulfate radical wrapped in the iron phosphate dihydrate can be better dissolved in the washing water and then removed, thus greatly reducing a water washing volume.

2. In the present disclosure, when the iron phosphate dihydrate filter residue loses free water and crystal water without drying and direct calcination, a pore is left in the particle, which provides a favorable condition for diffusion and removal of $SO_2$. An S content in finished products is less than 0.01%, which reaches a national standard of finished products of battery-grade nano iron phosphate.

3. The present disclosure is simple in process flow, low in cost, stable to control and easy in large-scale industrialization; and when the lithium iron phosphate is prepared by a traditional carbothermal reduction method, the particle size of the raw material needs to be reduced by wet grinding to improve a dispersion uniformity of all raw materials, and then spray drying is performed. In the present disclosure, a wet grinding process in a later stage is partially advanced to a preparation process of the iron phosphate, processes in former and later stages are combined, and technology steps are optimized and merged, which not only has a good guiding effect on technology optimization of the battery-grade nano iron phosphate, but also has a certain reference effect on a preparation technology of other related products.

BRIEF DESCRIPTION OF DRAWINGS

The present disclosure is further described hereinafter with reference to the accompanying drawings and embodiments, wherein.

DETAILED DESCRIPTION

The concept and the generated technical effect of the present disclosure are clearly and completely described hereinafter with reference to the embodiments to fully understand the objectives, the features and the effects of the present disclosure. Apparently, the described embodiments are only some but not all of the embodiments of the present disclosure, and based on the embodiments of the present disclosure, other embodiments obtained by those skilled in the art without going through any creative work all belong to the scope of protection of the present disclosure.

Embodiment 1

Figure 1:
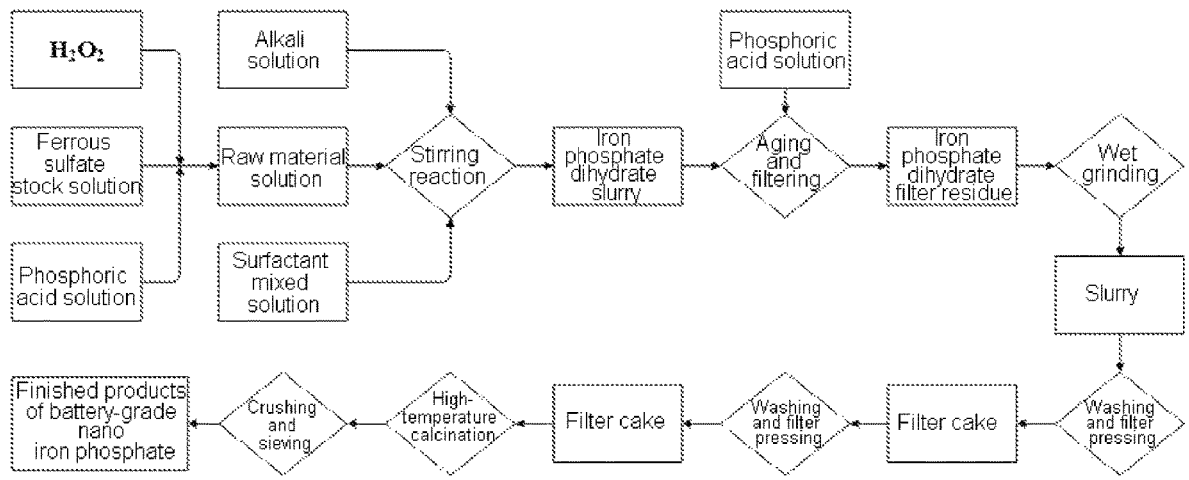
FIG. 1 is a flow chart of a technology in Embodiment 1 of the present disclosure.

Nano iron phosphate with low sulfur content was prepared in the embodiment, and with reference to a flow chart of a technology shown in FIG. 1, a specific process was as follows.

(1) A ferrous sulfate stock solution, an excessive oxidant $H_2O_2$ and a phosphoric acid solution were added into a stirring kettle and fully stirred to obtain a raw material solution, wherein a molar ratio of P/Fe in the raw material solution was 1.05:1. In addition, a sodium hydroxide solution with a concentration of 15% was prepared. In addition, a surfactant mixed solution with a concentration of 25% and a mass ratio of polyvinylpyrrolidone to sodium dodecyl sulfonate of 1:1 was prepared.

(2) The sodium hydroxide solution was slowly added into the raw material solution, and meanwhile, the surfactant mixed solution which accounted for 2% of a mass of the raw material solution was added. An adding speed was strictly controlled, a pH value was adjusted to be 1.7 to 1.9, and the mixture was fully stirred at a rotating speed of 200 rpm for reacting to obtain an iron phosphate dihydrate slurry.

(3) A certain volume of phosphoric acid solution with a concentration of 70% was added into the iron phosphate dihydrate slurry, the pH value was adjusted to be 1.3 to 1.6, and the mixture was heated to 85° C. and stirred at a rotating speed of 100 rpm for about 5 hours for an aging reaction. The reaction was finished when a particle size of products was controlled to be 8 μm to and the products were filtered to obtain an iron phosphate dihydrate filter residue.

(4) The iron phosphate dihydrate filter residue was mixed with deionized water according to a mass ratio of 1:1, and the slurry was ground to D50=3 μm by a sand mill to obtain a ground slurry. The above slurry was added into the deionized water which was 20 times a mass of the iron phosphate dihydrate filter residue to stir and wash for 30 minutes, and then filter pressing was performed to obtain a filter cake 1 with a water content of about 20%.

(5) The above filter cake was added into the deionized water which was 20 times the mass of the iron phosphate dihydrate filter residue to stir and wash for 30 minutes again, and then filter pressing was performed again to obtain a filter cake 2 with a water content of about 20%.

(6) The filter cake 2 was directly filled into a bowl and tapped, and then calcined at a high temperature of 700° C. for 1 hour under a heating rate of 8° C./min. Pure compressed air of 10 $Nm^3/h$ was introduced, and a calcined material was ground, crushed and sieved to obtain finished products of the battery-grade nano iron phosphate with low impurity content and excellent performance.

ICP test results showed that an S content in the iron phosphate dihydrate filter residue obtained in the embodiment was 0.3564%.

Figure 2:
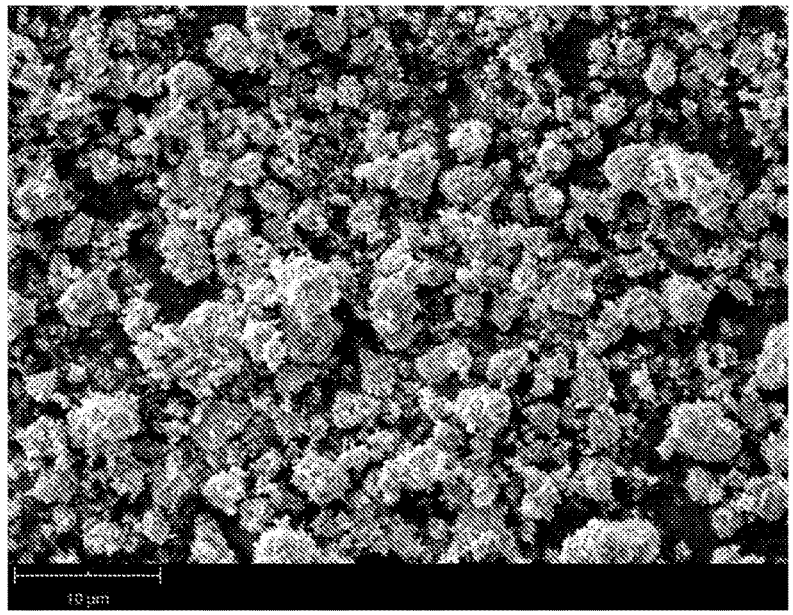
FIG. 2 is a SEM diagram of nano iron phosphate prepared in Embodiment 1 of the present disclosure.

FIG. 2 is a SEM diagram of the nano iron phosphate prepared in this embodiment. It can be seen from the SEM diagram that the synthesized battery-grade nano iron phosphate is changed from a conventional secondary particle aggregate into loose primary particles to be distributed disorderly, which is close to a state of the iron phosphate in wet grinding and coarse grinding technologies in a later stage, and the secondary particle aggregate is released, which is conducive to removal of the sulfur element impurity adhered inside.

Figure 3:
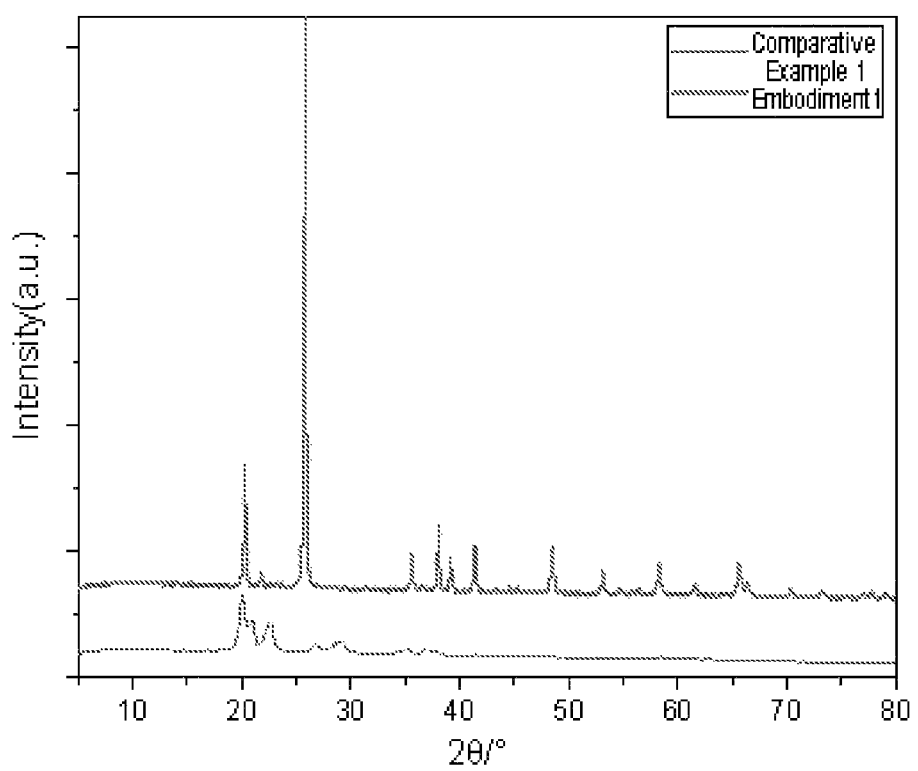
FIG. 3 is an XRD comparison diagram of nano iron phosphate prepared in Embodiment 1 and Comparative Example 1 of the present disclosure.

FIG. 3 is an XRD diagram of the nano iron phosphate prepared in Embodiment 1 and Comparative Example 1 of the present disclosure. It can be clearly seen from the XRD diagram that the iron phosphate prepared by a conventional low-temperature long-period calcination dehydration method in Comparative Example 1 is amorphous, while the iron phosphate prepared by the rapid high-temperature short-period calcination method in Embodiment 1 has a good crystallinity, a sharp characteristic peak, and a pure crystal phase structure without impurities.

Table 1 shows particle size distribution of iron phosphate products prepared in this embodiment.

TABLE 1

|  | D10 | D50 | D90 | D99 |
| --- | --- | --- | --- | --- |
| Particle size (μm) | 0.66 | 2.47 | 12.72 | 25.90 |

Embodiment 2

Nano iron phosphate with lowسulfur content was prepared in the embodiment, and a specific process was as follows.

(1) A ferrous sulfate stock solution, an excessive oxidant $H_2O_2$ and a phosphoric acid solution were added into a stirring kettle and fully stirred to obtain a raw material solution, wherein a molar ratio of P/Fe in the raw material solution was 1.05:1. In addition, a sodium hydroxide solution with a concentration of 15% was prepared. In addition, a surfactant mixed solution with a concentration of 25% and a mass ratio of polyvinylpyrrolidone to sodium dodecyl sulfonate of 1:1 was prepared.

(2) The sodium hydroxide solution was slowly added into the raw material solution, and meanwhile, the surfactant mixed solution which accounted for 2% of a mass of the raw material solution was added. An adding speed was strictly controlled, a pH value was adjusted to be 1.7 to 1.9, and the mixture was fully stirred at a rotating speed of 200 rpm for reacting to obtain an iron phosphate dihydrate slurry.

(3) A certain volume of phosphoric acid solution with a concentration of 70% was added into the iron phosphate dihydrate slurry, the pH value was adjusted to be 1.3 to 1.6, and the mixture was heated to 85° C. and stirred at a rotating speed of 100 rpm for about 5 hours for an aging reaction. The reaction was finished when a particle size of products was controlled to be 8 μm to 20 μm, and the products were filtered to obtain an iron phosphate dihydrate filter residue.

(4) The iron phosphate dihydrate filter residue was mixed with deionized water according to a mass ratio of 1:1, and the slurry was ground to D50=5 μm by a sand mill to obtain a ground slurry. The above slurry was added into pure water at 70° C. which was 15 times a mass of the iron phosphate dihydrate filter residue to stir and wash for 30 minutes, and then filter pressing was performed to obtain a filter cake 1 with a water content of about 20%.

(5) The above filter cake was added into the pure water at 70° C. which was 15 times the mass of the iron phosphate dihydrate filter residue to stir and wash for 30 minutes again, and then filter pressing was performed again to obtain a filter cake 2 with a water content of about 20%.

(6) The filter cake 2 was directly filled into a bowl and tapped, and then calcined at a high temperature of 600° C. for 1.5 hours under a heating rate of 8° C./min. Pure compressed air of 10 $Nm^3$/h was introduced, and a calcined material was ground, crushed and sieved to obtain finished products of the battery-grade nano iron phosphate with low impurity content and excellent performance.

Embodiment 3

Nano iron phosphate with low sulfur content was prepared in the embodiment, and a specific process was as follows.

(1) A ferrous sulfate stock solution, an excessive oxidant $H_2O_2$ and a phosphoric acid solution were added into a stirring kettle and fully stirred to obtain a raw material solution, wherein a molar ratio of P/Fe in the raw material solution was 1.05:1. In addition, a sodium hydroxide solution with a concentration of 15% was prepared. In addition, a surfactant mixed solution with a concentration of 25% and a mass ratio of polyvinylpyrrolidone to sodium dodecyl sulfonate of 1:1 was prepared.

(2) The sodium hydroxide solution was slowly added into the raw material solution, and meanwhile, the surfactant mixed solution which accounted for 2% of a mass of the raw material solution was added. An adding speed was strictly controlled, a pH value was adjusted to be 1.7 to 1.9, and the mixture was fully stirred at a rotating speed of 200 rpm for reacting to obtain an iron phosphate dihydrate slurry.

(3) A certain volume of phosphoric acid solution with a concentration of 70% was added into the iron phosphate dihydrate slurry, the pH value was adjusted to be 1.3 to 1.6, and the mixture was heated to 85° C. and stirred at a rotating speed of 100 rpm for about 5 hours for an aging reaction. The reaction was finished when a particle size of products was controlled to be 8 μm to 20 μm, and the products were filtered to obtain an iron phosphate dihydrate filter residue.

(4) The iron phosphate dihydrate filter residue was mixed with deionized water according to a mass ratio of 1:1, and the slurry was ground to D50=8 μm by a sand mill to obtain a ground slurry. The above slurry was added into 1% sodium carbonate solution which was 10 times a mass of the iron phosphate dihydrate filter residue to stir and wash for 30 minutes, and then filter pressing was performed to obtain a filter cake 1 with a water content of about 20%.

(5) The above filter cake was added into the deionized water which was 20 times the mass of the iron phosphate dihydrate filter residue to stir and wash for 30 minutes again, and then filter pressing was performed again to obtain a filter cake 2 with a water content of about 20%.

(6) The filter cake 2 was directly filled into a bowl and tapped, and then calcined at a high temperature of 450° C. for 3 hours under a heating rate of 8° C./min. Pure compressed air of 10 $Nm^3$/h was introduced, and a calcined material was ground, crushed and sieved to obtain finished products of the battery-grade nano iron phosphate with low impurity content and excellent performance.

Comparative Example 1

Nano iron phosphate was prepared in the comparative example, and a specific process was as follows.

An iron phosphate dihydrate filter residue was prepared according to the steps (1) to (3) in Embodiment 1, washed thrice with 50 times of deionized water for 30 minutes each time, dried at 120° C. for 10 hours after filter pressing, then filled in a bowl, and calcined at a high temperature of 300° C. for 5 hours under a heating rate of 5° C./min. Pure compressed air of 10 $Nm^3$/h was introduced, and a calcined material was ground, crushed and sieved to obtain finished products of the battery-grade nano iron phosphate.

Comparative Example 2

Iron phosphate dihydrate was prepared in the comparative example, which was different from that in Embodiment 1 in a ratio of a surfactant solution, and a specific process was as follows.

(1) A ferrous sulfate stock solution, an excessive oxidant $H_2O_2$ and a phosphoric acid solution were added into a stirring kettle and fully stirred to obtain a raw material solution, wherein a molar ratio of P/Fe in the raw material solution was 1.05:1. In addition, a sodium hydroxide solution with a concentration of 15% was prepared. In addition, a surfactant solution of hexadecyl trimethyl ammonium bromide with a concentration of 25% was prepared.

(2) The sodium hydroxide solution was slowly added into the raw material solution, and meanwhile, the surfactant solution which accounted for 2% of a mass of the raw material solution was added. An adding speed was strictly controlled, a pH value was adjusted to be 1.7 to 1.9, and the mixture was fully stirred at a rotating speed of 200 rpm for reacting to obtain an iron phosphate dihydrate slurry;

(3) A certain volume of phosphoric acid solution with a concentration of 70% was added into the iron phosphate dihydrate slurry, the pH value was adjusted to be 1.3 to 1.6, and the mixture was heated to 85° C. and stirred at a rotating speed of 100 rpm for about 5 hours for an aging reaction. The reaction was finished when a particle size of products was controlled to be 8 μm to 20 μm, and the products were filtered to obtain an iron phosphate dihydrate filter residue.

ICP test results showed that an S content in the iron phosphate dihydrate filter residue obtained in the comparative example was 0.8129%.

Quality of Finished Products

Table 1 shows impurity element contents in the finished products of the battery-grade nano iron phosphate prepared in Embodiments 1 to 3 and Comparative Example 1, and the specific data are obtained by an ICP-AES device.

TABLE 1

| Impurity contents of finished products of battery-grade nano iron phosphate | | | | |
|---|---|---|---|---|
| Impurity element content | Embodiment 1 | Embodiment 2 | Embodiment 3 | Comparative Example 1 |
| S | 0.0093 | 0.0086 | 0.0097 | 0.0649 |
| Mn | 0.0012 | 0.0011 | 0.0004 | 0.0026 |
| Na | 0.0092 | 0.0065 | 0.0133 | 0.0064 |
| Co | 0.0003 | 0.0002 | 0.0008 | 0.0089 |

TABLE 1-continued

Impurity contents of finished products
of battery-grade nano iron phosphate

| Impurity element content | Embodiment 1 | Embodiment 2 | Embodiment 3 | Comparative Example 1 |
|---|---|---|---|---|
| Al | 0.0052 | 0.0049 | 0.0076 | 0.0213 |
| Cr | 0.0143 | 0.0074 | 0.0097 | 0.0155 |

It can be seen from Table 1 that the sulfur impurity contents in the finished products of the battery-grade nano iron phosphate prepared in the embodiments are much lower than that in Comparative Example 1.

Table 2 shows a main difference between the preparation technologies in Embodiments 1 to 3 and Comparative Example 1.

TABLE 2

Technology difference between Embodiments
and Comparative Example

| Experimental group | Total water consumption | Time consumption of removal of S |
|---|---|---|
| Embodiment 1 | 40:1 | 7 hours |
| Embodiment 2 | 30:1 | 6.5 hours |
| Embodiment 3 | 30:1 | 6 hours |
| Comparative Example 1 | 150:1 | 20 hours |

It can be seen from Table 2 that the water consumption and the total time consumption of the technologies used in the embodiments are much lower than those of the technology used in Comparative Example 1.

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure. In addition, the embodiments of the present disclosure and the features in the embodiments may be combined with each other without conflict.

The invention claimed is:

1. A method for preparing nano iron phosphate, comprising the following steps of:
    S1: mixing a phosphorus source and an iron source to obtain a raw material solution, then adding alkali and a surfactant, adjusting a pH, and stirring and reacting to obtain an iron phosphate dihydrate slurry; wherein the iron source is ferrous sulfate, and an oxidant is further added in the raw material solution; and wherein the pH is 1.0 to 2.5;
    S2: adding a phosphoric acid solution into the iron phosphate dihydrate slurry, adjusting the pH, heating and stirring for aging, and filtering to obtain iron phosphate dihydrate;
    S3: adding water into the iron phosphate dihydrate for slurrying, and grinding to obtain a ground slurry; and
    S4: adding the ground slurry into a washing solution to wash, carrying out solid-liquid separation, and calcining a solid phase to obtain the nano iron phosphate with a sulfur content of less than 0.01%; wherein the calcining is performed at 450° C. to 800° C. for 0.5 hour to 5 hours, and compressed air is required for the calcining.

2. The method for preparing of claim 1, wherein in step S1, a molar ratio of the iron to the phosphorus in the raw material solution is 1:(0.9 to 1.1).

3. The method for preparing of claim 1, wherein in step S1, the surfactant is compounded by polyvinylpyrrolidone and sodium dodecyl sulfonate in a mass ratio of 1:1.

4. The method for preparing of claim 3, wherein in step S1, the surfactant and water are prepared into a surfactant mixed solution with a mass concentration of 10% to 40%, and a mass ratio of the raw material solution to the surfactant mixed solution is 1:(0.004 to 0.04).

5. The method for preparing of claim 1, wherein in step S2, a particle size of the obtained iron phosphate dihydrate is 8 μm to 20 μm.

6. The method for preparing of claim 1, wherein in step S3, a particle size D50 of a dispersed phase of the ground slurry is 2.5 μm to 10 μm.

7. The method for preparing of claim 1, wherein in step S4, the washing solution is one of hot water at 60° C. to 90° C. or 0.5% to 2% sodium carbonate solution.

* * * * *